US006590756B2

(12) United States Patent
Meiners et al.

(10) Patent No.: US 6,590,756 B2
(45) Date of Patent: Jul. 8, 2003

(54) NETWORK PROTECTOR CABLE TRIP ASSEMBLY

(75) Inventors: Steven E. Meiners, Beaver Falls, PA (US); Stephen W. Oneufer, Cranberry Township, PA (US); Arthur J. Jur, Aliquippa, PA (US); Douglas M. Brandt, Ellwood City, PA (US)

(73) Assignee: Eaton Corporation, Cleveland, OH (US)

( * ) Notice: Subject to any disclaimer, the term of this patent is extended or adjusted under 35 U.S.C. 154(b) by 59 days.

(21) Appl. No.: 09/993,263

(22) Filed: Nov. 21, 2001

(65) Prior Publication Data

US 2003/0095364 A1 May 22, 2003

(51) Int. Cl.$^7$ ................................................ H02H 3/00
(52) U.S. Cl. ...................... 361/62; 200/50.11; 200/331; 200/334
(58) Field of Search .......................... 361/62, 609, 615, 361/819; 200/50.1, 50.11, 50.12, 329, 330, 331, 334

(56) References Cited

U.S. PATENT DOCUMENTS

| | | | | |
|---|---|---|---|---|
| 3,991,291 A | * | 11/1976 | McGuffie et al. | 200/50.02 |
| 4,206,329 A | * | 6/1980 | Jarosz | 200/50.26 |
| 4,626,638 A | * | 12/1986 | Samples et al. | 200/331 |
| 6,034,861 A | * | 3/2000 | Meiners et al. | 361/115 |
| 6,225,581 B1 | * | 5/2001 | Gerbert-Gaillard et al. | 200/50.01 |

OTHER PUBLICATIONS

Cutler–Hammer, "Instructions for Cutler–Hammer Type CMD1875 AMP thorugh 3000 Amp Network Protectors," Dec. 1995, pp. i–ix, 1–49.
Culter–Hammer, "CMD Network Protector," Jul. 1993, pp. 1–24.

* cited by examiner

Primary Examiner—Adolf D. Berhane
Assistant Examiner—Gary L. Laxton
(74) Attorney, Agent, or Firm—Martin J. Moran

(57) ABSTRACT

A cable trip assembly includes an actuating assembly, a mounting assembly, and a cable assembly. The cable assembly includes a cable member disposed within a sheath. The cable member has a first end and a second end. The cable member first end is coupled to a lever, which is part of the actuating assembly, which is structured to move between a first position and a second position, similar to the prior art lever. The cable member second end is coupled to the circuit breaker trip bar. The sheath is mounted on a rigid frame, preferably a portion of the circuit breaker. Thus, with the sheath held stationary, the lever can move the cable within the sheath between a first and second position as the lever moves between its first position and second position. Because the cable member second end is coupled to the circuit breaker trip bar, the trip bar is also moved between the trip bar first and second positions as the lever moves between the lever first position and second position.

16 Claims, 4 Drawing Sheets

NETWORK PROTECTOR CABLE TRIP ASSEMBLY

BACKGROUND OF THE INVENTION

1. Field of the Invention

This invention relates to a network protector and, more specifically, to a network protector which incorporates a cable trip assembly.

2. Description of the Prior Art

Secondary power distribution networks consist of interlaced grids which are supplied by two or more sources of power so that the loss of a single source of power will not result in an interruption of service. Such networks provide the highest level of reliability possible with conventional power distribution and are normally used to supply high-density load areas such as a section of a city, a large building, or an industrial site. Between the power sources and the network is a transformer and a network protector. The network protector consists of a circuit breaker and a control relay. The circuit breaker includes at least one set of main contacts that move between an open position and a closed position. When the main contacts are closed, electricity may flow through the network protector. The control relay senses the transformer and network voltages and line currents and executes algorithms to initiate breaker tripping or closing action. Trip determination is based on detecting an overcurrent condition or reverse power flow, that is, power flow from the network to the energy source.

Network protectors are often found in dust-proof or moisture-proof housings, or vaults, which are disposed in subterranean passageways in large metropolitan areas. Given their urban, subterranean location, increasing the size of the vault to accommodate larger network protectors is costly and difficult. As such, it is more efficient to reduce the space occupied by certain network protector components so as to allow space for other newer/larger components. That is, by reducing the size of one component or sub-component, another component may be added or an existing component's size may be increased.

The network protector components, the circuit breaker and the relay, are located within a enclosure within the vault. For safety, the circuit breaker should be tripped before the circuit breaker can be removed form the enclosure. To accomplish this, network protectors include a mechanical trip assembly which is structured to interact with the network protector trip bar. The trip bar is structured to move between a first position and a second position. In the first position, the trip bar prevents the main contacts of the network protector circuit breaker from moving into the closed position. Thus, when the trip bar is in the first position, the contacts are open. In the second position, the trip bar allows the main contacts to be moved into the closed position.

To safely install or remove the circuit breaker from the enclosure, the main contacts must be in the first, open position. To trip the circuit breaker, the trip bar must be moved into the first position. The mechanical trip assembly was structured to be actuated prior to opening the door to the enclosure. Thus, when the door to the enclosure was opened, the mechanical trip assembly, and therefore the trip bar, are in the first position. Thus, before the enclosure is opened, the circuit breaker was tripped. If required, however, it was possible to open the enclosure with the trip bar in the second position, leaving the circuit breaker in the closed position. After maintenance and/or repairs are performed on the circuit breaker or the relay, and after the circuit breaker is installed in the vault, the mechanical trip assembly, and therefore the trip bar, were moved into the second position so that the main contacts could be closed.

As shown in FIGS. 1A and 1B, the prior art mechanical trip assembly 1 included a lever 2, a plurality of rigid members 3, 4 and an end piece 5. The end piece 5 engaged the trip bar 6 on the circuit breaker 7 (shown in part). The mechanical trip assembly 1 and the circuit breaker 7 were both mounted on a frame 8 that was structured to move in and out of the enclosure (not shown). A spring 9 biased the mechanical trip assembly in a first position in which the trip bar 6 was moved into the trip bar first position which tripped the circuit breaker 7.

In operation, when the circuit breaker 7 was in use and disposed within the enclosure, the lever 2 was held at about a 45 degree angle so that the mechanical trip assembly 1 was in a second position holding the trip bar in the second position. Prior to opening the door to the enclosure, a user actuated an external handle (not shown) which was coupled to the lever 2, thereby moving the mechanical trip assembly 1 in to the first position which, in turn, moved the trip bar 6 into the first position causing the circuit breaker 7 to trip. At this point the circuit breaker 7 could be safely removed from the enclosure. After the circuit breaker 7 was returned to the enclosure and the enclosure closed, the procedure for closing the circuit breaker 7 contacts included a step which returned the lever 2 to a 45 degree angle, i.e., the mechanical trip assembly 1 and the trip bar 6 were both moved into their respective second positions thereby allowing the contacts to be closed.

The mechanical trip assembly 1 occupies a certain amount of space within the enclosure. This includes occupying a certain width as best seen in FIG. 1A. If the width and/or size of the mechanical trip assembly 1 could be reduced, the space could be occupied by other sub-components of the network protector. Thus, the network protector could be upgraded without having to reconstruct the enclosure and/or vault. Additionally, mechanical trip assemblies have other disadvantages. For example, if one rigid member 3, 4, or other part failed, the entire assembly would not operate properly. Additionally, manufacturing tolerances at each attachment point between the rigid members, lever, and other parts had a cumulative effect making positioning of the end piece 5 on the trip bar 6 difficult.

There is, therefore, a need for a trip assembly that occupies less room than a mechanical trip assembly.

There is a further need for a trip assembly that has fewer components than a mechanical trip assembly.

There is a further need for a trip assembly that securely engages the trip bar.

SUMMARY OF THE INVENTION

These needs, and others, are satisfied by the invention which provides a cable trip assembly. The cable trip assembly includes an actuating assembly, a mounting assembly, and a cable assembly. The cable assembly includes a cable member disposed within a sheath. The cable member has a first end and a second end. The cable member first end is coupled to a lever, which is part of the actuating assembly, which is structured to move between a first position and a second position, similar to the prior art lever. The cable member second end is coupled to the circuit breaker trip bar. The sheath is mounted on a rigid frame, preferably the circuit breaker itself. Thus, with the sheath held stationary, the lever can move the cable within the sheath between a first and second position as the lever moves between its first position and second position. Because the cable member second end is coupled to the circuit breaker trip bar, the trip bar is also moved between the trip bar first and second positions as the lever moves between the lever first position and second position.

The cable trip assembly occupies less space than the prior art mechanical trip assembly. Thus, the space that was previously reserved for the mechanical trip assembly may be utilized by other components or sub-components. Additionally, the cable trip assembly has fewer linkages between the lever and the trip bar and therefore, the aggregate of the manufacturing tolerances for the cable trip assembly is less than the aggregate of the manufacturing tolerances for the mechanical trip assembly.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENT

Figure 2:
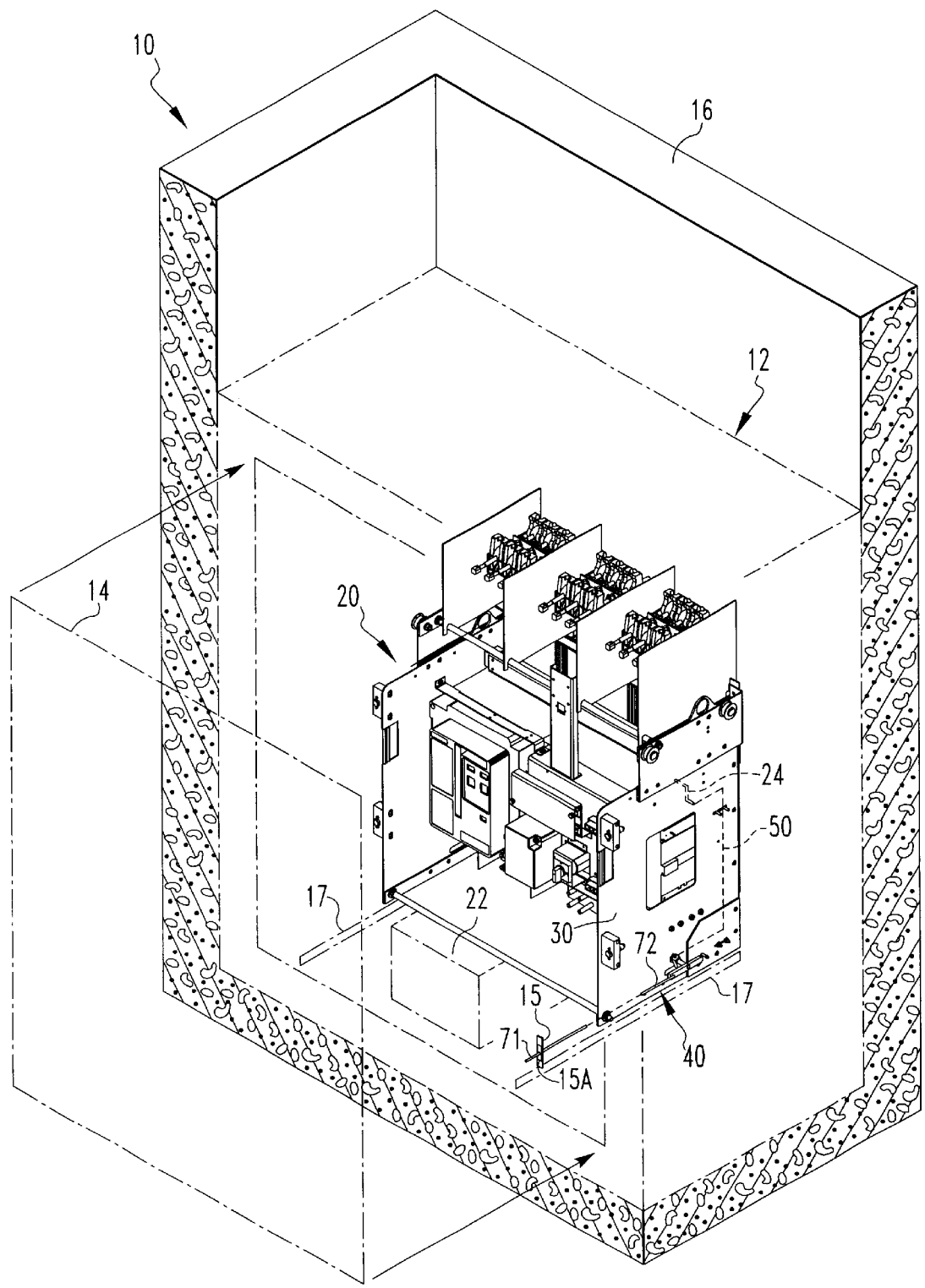
FIG. 2 is a isometric view of a network protector.

As shown in FIG. 2, a network protector 10 includes a enclosure 12 which includes a movable door 14 that is attached to the enclosure 12. The door 14 has a external handle extension assembly 15 which passes therethrough. The handle extension assembly 15, as will be described below, interacts with the cable trip assembly 40 and may be actuated while the door 14 is closed. The enclosure 12 is structured to be placed within a vault 16. The vault 16 is typically made of concrete or a similar material. The two primary network protector components, a circuit breaker 20 and a relay 22 are disposed within the enclosure 12. The enclosure 12 includes a set of rails 17 (shown schematically) upon which the circuit breaker 20 may be moved into and out of the enclosure 12.

The circuit breaker includes at least one set of main contacts (not shown) that are structured to move between a first, open position and a second closed position. When the main contacts are in the second, closed, electricity may flow through the circuit breaker 20. When the main contacts are in the first, open position, electricity cannot flow through the circuit breaker. The circuit breaker 20 also includes an operating mechanism (not shown) that is structured to move the main contacts between the first and second position. The operating mechanism includes a trip bar 24. The trip bar is structured to move between a first position and a second position.

When the circuit breaker 20 is in use, both the main contacts and the trip bar 24 are in the second position. When the trip bar 24 moves from the second position to the first position, the operating mechanism will trip the circuit breaker 20. That is, the operating mechanism will cause the main contacts to move from the second position to the first position. So long as the trip bar 24 remains in the first position, the main contacts cannot be fixed in the second position. That is, so long as the trip bar 24 is in the first position, the circuit breaker 20 cannot be set in the closed position.

Figure 1B:
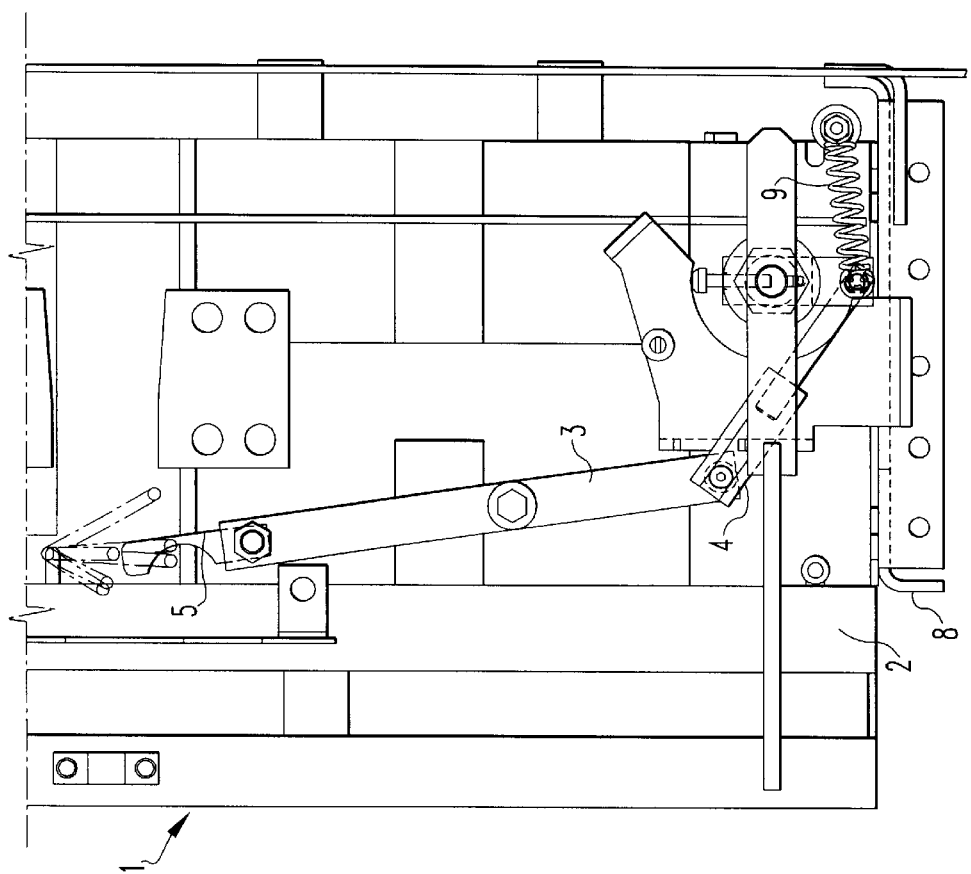
FIG. 1B is a side view of the prior art mechanical trip assembly.
Figure 1A:
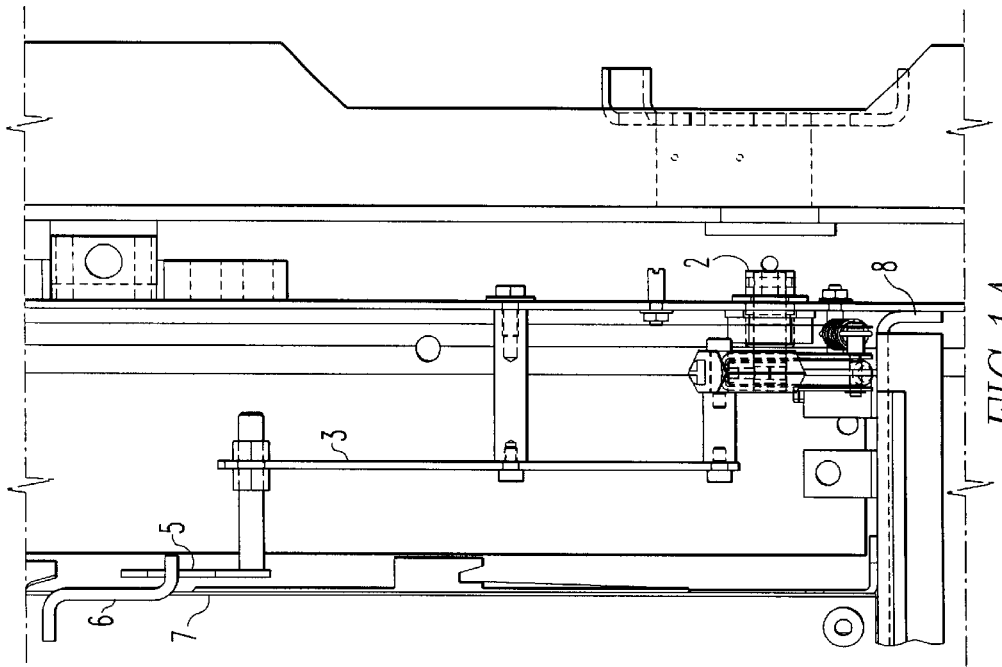
FIG. 1A is a front view of the prior art mechanical trip assembly.
Figure 3:
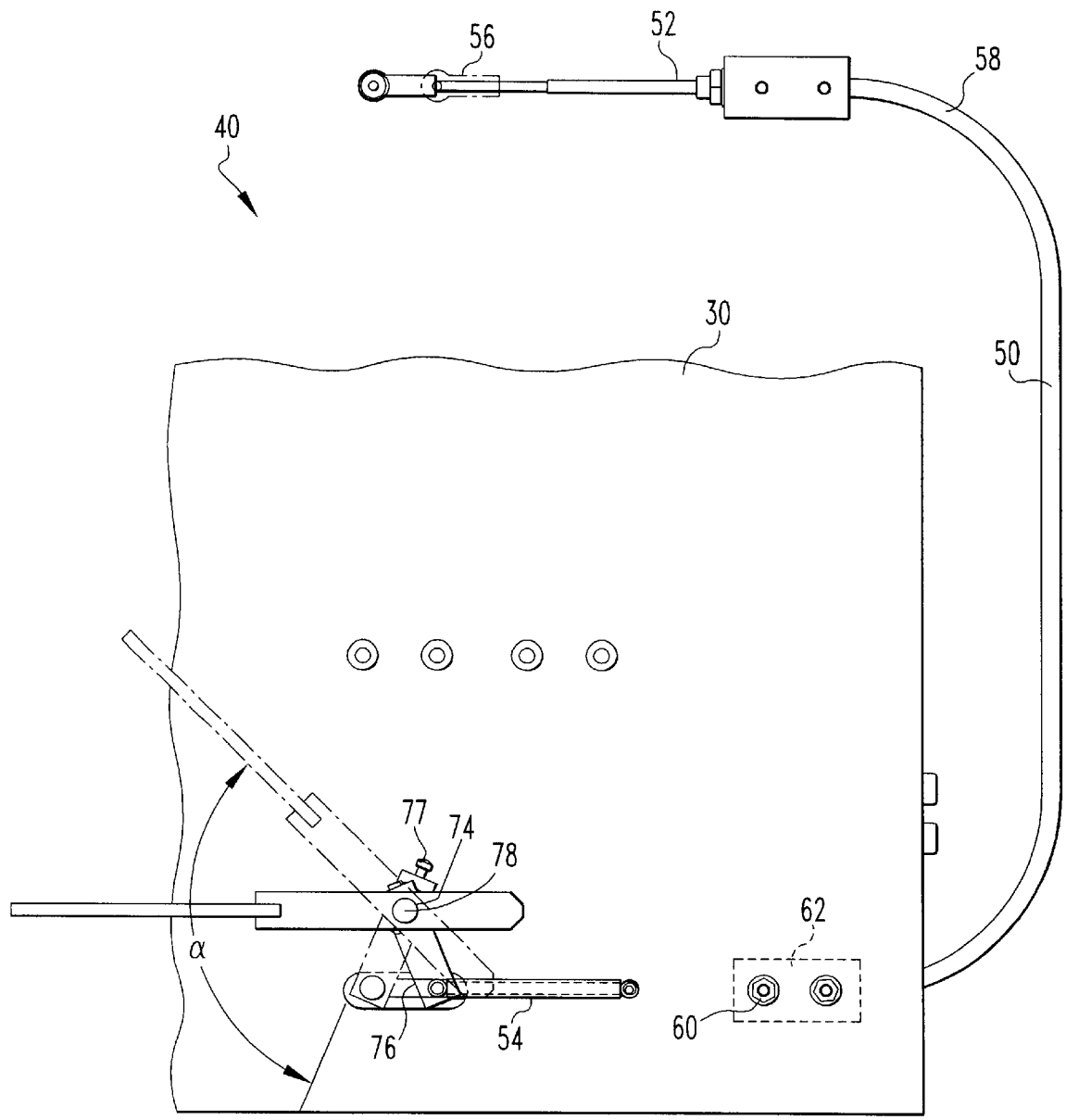
FIG. 3 is a side view of the cable trip assembly.
Figure 4:
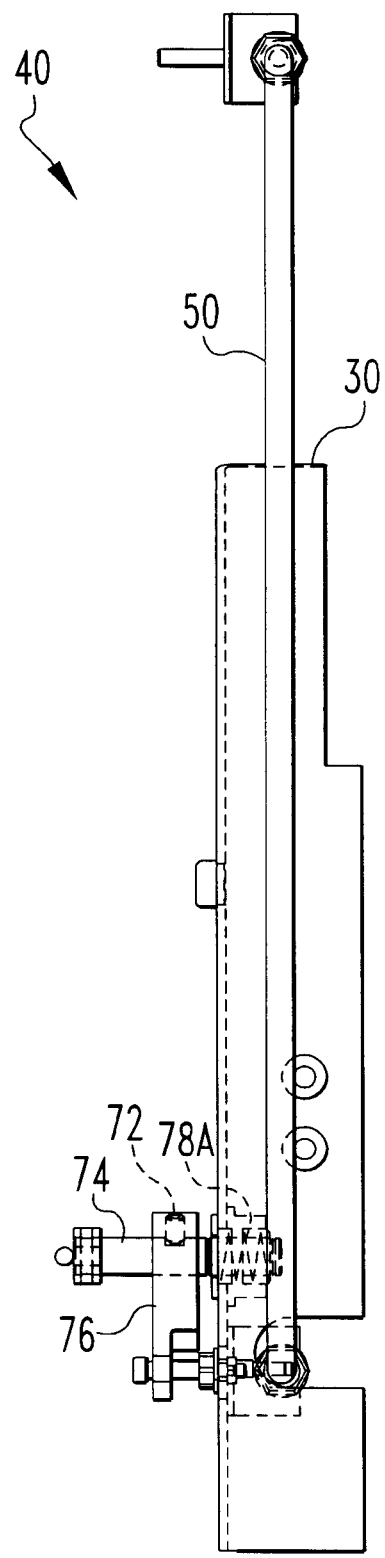
FIG. 4 is front view of the cable trip assembly.

The cable trip assembly 40, shown in FIGS. 3–5 is one safety device used to ensure the circuit breaker 20 is in the tripped condition when the enclosure door 14 is opened. The cable tip assembly 40 is mounted on a side sheet 30 (shown in ghost on FIG. 1) which is attached to the circuit breaker 20. The cable trip assembly 40 includes a cable assembly 50, a cable mounting assembly 60 and an actuating assembly 70. The cable assembly 50 includes an elongated, flexible cable member 52. The cable member 42 has a first end 54 and a second end 56. The cable member 52 is disposed within a sheath 58. The cable member 52 is structured to slide within the sheath 58 between a first position and a second position. The cable first end 54 is structured to be attached to the actuating assembly 70, and the cable second end is structured to be attached to the circuit breaker trip bar 24.

As shown in FIG. 3, the mounting assembly 60 includes at least one bracket 62 which is attached to sheath 58 and attached to side sheet 30. The mounting assembly 70 may include other coupling means such as U-bolts or rod ends. As such, the mounting assembly 60 allows the cable member 52 to move between the first and second positions while the sheath 58 remains fixed to the side sheet 30.

The actuating assembly 70 includes a lever arm 72, an axle 74, a cable arm 76, and a spring 78. The lever arm 72 and the cable arm 76 are both attached to the axle 74. The lever arm 72 and the cable arm 76 are attached to the axle 74 so that there is an angle|→ between the lever arm 72 and the cable arm 76. The cable arm 76 is rotatably coupled to the axle 74 and further includes an adjustment screw 77. The adjustment screw 77 secures the cable arm 76 to the axle 74. Thus, when the adjustment screw 77 is loose, the cable arm 76 may be rotated about axle 74, thereby changing the angle|→ between the lever arm 72 and the cable arm 76.

The axle 74 is rotatably attached to the side sheet 30. The axle, and therefore the lever arm 72 and the cable arm 76, rotates between a first position and a second position. The motion of the lever arm 72, the axle 74 and the cable arm 76 is also referred to as the motion of the actuating assembly 70. When the actuating assembly is in the first position, the lever arm 72 extends generally horizontally. The cable arm 76 is also coupled to the cable fist end 54. The spring 78 in one embodiment is a torsion spring 78A (FIG. 4) disposed about the axle. The torsion spring 78A interacts with the axle 74 and the side sheet 30 to bias the actuating assembly into the first position.

When the cable trip assembly 40 is assembled, the cable assembly is mounted on the side sheet 30 by the mounting assembly 60. The actuating assembly 70 is coupled to the cable first end 54, and the second cable end 56 is attached to the trip bar 24. When the actuating assembly 70 is in the first position, the cable member 52 and the trip bar 24 are also in their respective first positions. As the actuating assembly 70 is moved into the actuating assembly second position, the cable member 52 and the trip bar 24 are also moved into their respective second positions. Because the trip bar 24 interacts with the operating mechanism of the circuit breaker 20, operation of the actuating assembly 70 affects the position of the main contacts. More specifically, when the actuating assembly 70 is in the first position, the contacts are in the first, open position. So long as the actuating assembly 70 remains in the first position, the operating mechanism cannot keep the main contacts closed. When the actuating assembly 70 is in the second position, the trip bar 24 is also in the second position, and the operating mechanism may set the main contacts in the closed position.

In operation, a handle extension 71 is coupled to the lever arm 72. The handle extension 71 is part of the handle extension assembly 15 that extends through door 14. The handle extension assembly 15 includes an essentially waterproof opening 15A in door 14. The handle extension assembly 15 supports the handle extension 71 so that the handle extension 71 may move the lever arm 72 between the lever arm 72 first and second positions. That is, when the enclosure door 14 is closed, the lever arm 72 and handle extension 71 are held in the second position. This position of the lever arm 72 corresponds to the second position of the actuating assembly 70. Thus, so long as the enclosure cover remains closed, the actuating assembly 70, and therefore the main contacts, are in the second position, i.e. the main contacts are closed. To open the main contacts prior to opening the enclosure door 14, the lever arm 72, and handle extension 71, are be moved to the first position. When the enclosure door 14 has been removed, the handle extension assembly 15 no longer interacts with the lever arm 72. When gravity and the spring 78 act on the lever arm 72, the actuating assembly 70 is moved into the first position. Accordingly, the actuating assembly 70, acting through the cable assembly 50, causes the trip bar 24 to move into the first position. The trip bar 24 trips the circuit breaker 20 by causing the operating mechanism to move the main contacts into the first, open position. While the enclosure door 14 is open, the spring 78 biases the actuating assembly 70 into the first position. Thus, before the enclosure door 14 is removed, the circuit breaker 20 is tripped. If required, the lever arm 72 may be held in the second position during the removal of the door 14 so that the main contacts do not separate. However, the cable trip assembly 40 is coupled to a latching mechanism (not shown) that interacts with the rails 17. The latching mechanism prevents the circuit breaker from being removed from the vault so long as the lever arm 72 is in the second position. Thus, to remove the circuit breaker 20 from the enclosure 12, the lever arm 72 must be in the second position and, therefore, as described above, the main contacts must be open.

The circuit breaker 20 will remain tripped so long as the actuating assembly 70, and therefore the trip bar 24, is in the first position. That is, having the trip bar 24 in the first position will prevent the operating mechanism from having the main contacts in the second, closed position. While the circuit breaker 20 is tripped, the circuit breaker 20 may be removed from the enclosure 12. After maintenance and/or repair operations are complete, the circuit breaker 20 is installed in the enclosure 12. After the enclosure door 14 is closed, the handle extension assembly 15 re-engages the lever arm 72. Using the handle extension assembly 15, the lever arm 72 is moved so that the actuating assembly 70 is in the second position, thereby moving the trip bar 24 into the trip bar second position. When the enclosure door 14 is closed, the actuating assembly 70 held in the second position. At this point, the main contacts of the circuit breaker 20 may be closed.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breadth of the claims appended and any and all equivalents thereof.

What is claimed is:

1. A cable trip assembly for a network protector, said network protector having a enclosure with a door and an external handle extension, wherein said door moves between an open position and a closed position, a relay assembly and a circuit breaker assembly, said circuit breaker assembly having at least one set of main contacts structured to move between a first, open position and a second, closed position, said circuit breaker further having a trip bar structured to interact with said at least one set of main contacts and to move between a first position and a second position wherein when said trip bar is in said first position said contacts are moved into said main contact first, open position and prevented from moving into said second closed position and when said trip bar is in said trip bar second position, said main contacts may be moved into said main contact second, closed position, said cable trip assembly comprising:

a cable assembly structured to move between a first position and a second position;

a cable mounting means;

an actuating means having a first position and a second position and structured to move said cable assembly between said cable assembly first position and a second position; and said cable assembly coupled to said trip bar so that when said cable assembly is in said cable assembly first position, said trip bar is in said trip bar first position and when said cable assembly is in said cable assembly second position, said trip bar is in said trip bar second position.

2. The cable trip assembly of claim 1, wherein:

said cable assembly includes a cable member having a first and a second end, and a cable sheath;

said cable member structured to move axially within said cable sheath; and said cable member first end coupled to said trip bar.

3. The cable trip assembly of claim 2, wherein said actuating means comprises:

a lever arm;

an axle;

a cable arm;

said axle extending through said lever arm and said cable arm;

said cable arm coupled to said cable second end;

said axle coupled to said circuit breaker;

said cable arm and said lever arm structured to rotate about said axle in a fixed angular relationship; and said cable arm and said lever arm are structured to pivot between a first position and a second position wherein said cable arm and lever arm first position correspond to said cable member first position and wherein said second cable arm and lever arm second position correspond to said cable member second position.

4. The cable trip assembly of claim 3, wherein said mounting means includes a spring means structured to bias said cable arm to said cable arm first position and said lever arm to said lever arm first position.

5. The cable trip assembly of claim 4, wherein said spring means is a torsion spring disposed about said axle.

6. The cable trip assembly of claim 5, wherein said lever arm is structured to interact with said enclosure door handle extension so that when said door is in said closed position, said lever arm is in said second position and when door is in said open position, said spring biases said lever arm to said first position.

7. The cable trip assembly of claim 3, wherein said mounting means includes at least one bracket structured to couple said cable sheath to said circuit breaker.

8. The cable trip assembly of claim 3, wherein:

said cable arm is rotatably coupled to said axle; and said cable arm includes an adjustment screw structured to secure said cable arm to said axle.

9. A network protector comprising:

a enclosure having a door and an external handle extension;

said door structured to move between an open position and a closed position;

a relay assembly;

a circuit breaker assembly having at least one set of main contacts structured to move between a first, open position and a second, closed position;

said circuit breaker further having a trip bar structured to interact with said at least one set of main contacts and to move between a first position and a second position wherein when said trip bar is in said first position said contacts are moved into said main contact first, open position and prevented from moving into said second closed position and when said trip bar is in said trip bar second position, said main contacts may be moved into said main contact second, closed position;

a cable trip assembly comprising:

a cable assembly structured to move between a first position and a second position;

a cable mounting means;

an actuating means having a first position and a second position and structured to move said cable assembly between said cable assembly first position and a second position; and said cable assembly coupled to said trip bar so that when said cable assembly is in said cable assembly first position, said trip bar is in said trip bar first position and when said cable assembly is in said cable assembly second position, said trip bar is in said trip bar second position.

10. The network protector of claim 9, wherein:

said cable assembly includes a cable member having a first and a second end, and a cable sheath;

said cable member structured to move axially within said cable sheath; and said cable member first end coupled to said trip bar.

11. The network protector of claim 10, wherein said actuating means comprises:

a lever arm;

an axle;

a cable arm;

said axle extending through said lever arm and said cable arm;

said cable arm coupled to said cable second end;

said axle coupled to said circuit breaker;

said cable arm and said lever arm structured to rotate about said axle in a fixed angular relationship; and said cable arm and said lever arm are structured to pivot between a first position and a second position wherein said cable arm and lever arm first position correspond to said cable member first position and wherein said second cable arm and lever arm second position correspond to said cable member second position.

12. The network protector of claim 11, wherein said mounting means includes a spring means structured to bias said cable arm to said cable arm and said lever arm to said first position.

13. The network protector of claim 12, wherein said spring means is a torsion spring disposed about said axle.

14. The network protector of claim 13, wherein said lever arm is structured to interact with said enclosure door handle extension so that when said door is in said closed position, said lever arm is in said second position and when door is in said open position, said spring biases said lever arm to said first position.

15. The network protector of claim 11, wherein said mounting means includes at least one bracket structured to couple said cable sheath to said circuit breaker.

16. The network protector of claim 11, wherein:

said cable arm is rotatably coupled to said axle; and said cable arm includes an adjustment screw structured to secure said cable arm to said axle.

* * * * *